United States Patent
Driesen et al.

(10) Patent No.: US 10,191,733 B2
(45) Date of Patent: Jan. 29, 2019

(54) SOFTWARE CHANGE PROCESS ORCHESTRATION IN A RUNTIME ENVIRONMENT

(71) Applicants: Volker Driesen, Walldorf (DE); Andreas Jahr, Karlsruhe (DE)

(72) Inventors: Volker Driesen, Walldorf (DE); Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 690 days.

(21) Appl. No.: 13/926,220

(22) Filed: Jun. 25, 2013

(65) Prior Publication Data
US 2014/0380265 A1    Dec. 25, 2014

(51) Int. Cl.
*G06F 8/70* (2018.01)
(52) U.S. Cl.
CPC ..................... *G06F 8/70* (2013.01)
(58) Field of Classification Search
None
See application file for complete search history.

(56) References Cited

U.S. PATENT DOCUMENTS

| | | | | |
|---|---|---|---|---|
| 5,418,953 A | * | 5/1995 | Hunt | G06F 9/5066 718/102 |
| 5,933,646 A | * | 8/1999 | Hendrickson | G06F 8/71 713/100 |
| 7,950,007 B2 | * | 5/2011 | Mohindra | G06F 8/60 709/230 |
| 8,234,387 B2 | | 7/2012 | Bradley et al. | |
| 8,271,336 B2 | | 9/2012 | Mikurak | |
| 8,285,578 B2 | | 10/2012 | Sheppard | |
| 8,311,904 B2 | | 11/2012 | Steinbach et al. | |
| 8,316,380 B2 | | 11/2012 | Keil et al. | |
| 8,347,402 B2 | | 1/2013 | Imrey et al. | |
| 8,381,176 B1 | | 2/2013 | Bentley et al. | |
| 2002/0040469 A1 | * | 4/2002 | Pramberger | G06F 8/71 717/121 |
| 2002/0116454 A1 | * | 8/2002 | Dyla | G06Q 30/06 709/203 |
| 2004/0162741 A1 | | 8/2004 | Flaxer et al. | |

(Continued)

FOREIGN PATENT DOCUMENTS

EP    2270725 A2    1/2011

OTHER PUBLICATIONS

Serena Software Inc;Orchestrate Change and Release Management—Transition With Serena;2014,accessed on Jul. 21, 2014;4, © 2014 Serena Software Inc;Hillsboro, USA (http://www.serena.com/index.php/en/so-operations/chang-and-release-management).

*Primary Examiner* — Robert E Fennema
*Assistant Examiner* — Jigneshkumar C Patel
(74) *Attorney, Agent, or Firm* — Schwegman Lundberg & Woessner, P.A.

(57) ABSTRACT

Systems and methods to manage software change process orchestration are provided. In example embodiments, an indication to initiate a software change process is received. A process required to be performed for the software change process is identified in response to receiving the indication. Using a uniform software logistic protocol capable of accessing tools across different platforms and environments, a tool mapped to the process required to be performed for the software change process is triggered to be executed.

20 Claims, 9 Drawing Sheets

(56) References Cited

U.S. PATENT DOCUMENTS

| | | | |
|---|---|---|---|
| 2004/0187103 A1* | 9/2004 | Wickham | G06F 8/65 717/168 |
| 2006/0242626 A1* | 10/2006 | Pham | G06F 9/44505 717/121 |
| 2007/0256050 A1* | 11/2007 | Behnia | G06F 8/70 717/104 |
| 2008/0098099 A1* | 4/2008 | Khasnis | G06F 8/61 709/222 |
| 2009/0265586 A1* | 10/2009 | Fitoussi | G06F 8/61 714/48 |
| 2012/0016833 A1 | 1/2012 | Janiesch et al. | |
| 2012/0030666 A1* | 2/2012 | Laicher | G06F 8/65 717/173 |
| 2012/0222004 A1 | 8/2012 | Labat et al. | |
| 2014/0125672 A1* | 5/2014 | Winternitz | G06F 8/38 345/440 |
| 2014/0157262 A1* | 6/2014 | Hicks | G06F 9/45537 718/1 |

* cited by examiner

SOFTWARE CHANGE PROCESS ORCHESTRATION IN A RUNTIME ENVIRONMENT

FIELD

The present disclosure relates generally to managing software processes and, in a specific example embodiment, to managing software change process orchestration.

BACKGROUND

Conventionally, complexity of software change management has increased. There are different ways of using software change tools (e.g., standard productive, test development, demonstrations, and trial systems), different runtime environments (e.g., classical hardware, virtualized hardware, private and public clouds), and different product runtimes (e.g., JAVA, SAP HANA, ABAP) that need to be considered. The change procedures thus involve more and more different tools for different platforms and products for different environments. Thus, complexity increases for an organization building the tools and for users using the tools. Additionally, as products span different platforms and runtime environments, a change or a new deployment of a product, for example, may comprise different tasks for components of the product and the platform the product needs to run on.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods to provide software change process orchestration are provided. Conventionally, a multitude of environments, products, and technology platforms exist where software logistics tools and processes are needed. Software logistics include configuration, installation, updates or upgrades, as well as corrections. With this multitude of different environments, be it on-premise or software-as-a-service (SaaS), there are requirements on service providers and customers that do adaptions to tools associated with the software change process. That is, there are a large variety of software logistic processes to be supported that are implemented in different tools. Example embodiments manage this heterogeneity to provide software change process orchestration. This orchestration focuses on building composed processes using processes implemented in existing tools (e.g., recombine these existing processes). Additionally, orchestration provides a user interface (UI) that is uniform across the different processes so that there is a uniform look and feel with a same type of activity that the user of the tools carries out. For example, similar terminology of items that are similar may be provided in the uniform UI.

As such, systems and methods to manage software change process orchestration are provided. In example embodiments, an indication to initiate a software change process is received. A process required to be performed for software change process is identified in response to receiving the indication. Using a uniform software logistic protocol capable of accessing tools across different platforms and environments, a tool mapped to the process required to be performed for the software change process is triggered to be executed.

In example embodiments, an orchestration engine or system is configured to receive an indication to initiate a software change process. The orchestration engine then identifies a process required to be performed for the software change process in response to receiving the indication. A tool mapped to the process required to be performed for the software change process is executed using a uniform software logistic protocol capable of accessing tools across different platforms and environments.

By using embodiments of the present invention, users do not need to customize software change processes to their particular system. Software changes may comprise installation, configuration, correction, update, upgrade, copy, transport, and deletion of software. Additionally, the user interfaces provided to manage software changes are uniform, thus providing a familiar interface to users. Accordingly, one or more of the methodologies discussed herein may obviate a need for time-consuming manual customization and provide more uniform GUIs, which may have the technical effect of reducing computing resources used by one or more devices within the system. Examples of such computing resources include, without limitation, processor cycles, network traffic, memory usage, storage space, and power consumption.

Figure 1:
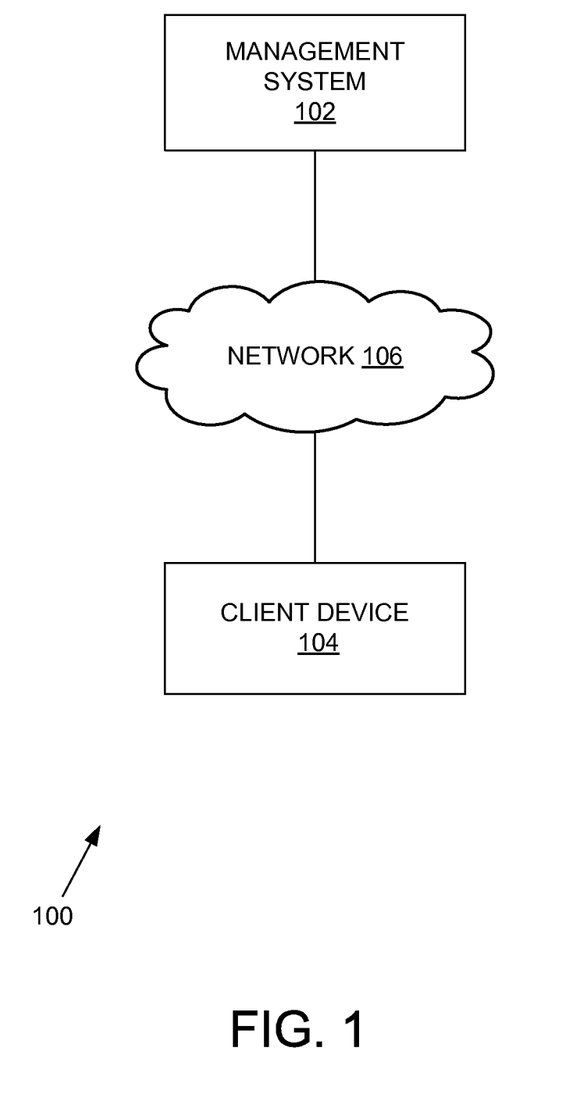
FIG. 1 illustrates an environment in which example embodiments of the inventive subject matter may be practiced.

With reference to FIG. 1, an environment 100 in which example embodiments of the inventive subject matter may be practiced is shown. The environment 100 comprises a management system 102 communicatively coupled to one or more client devices 104. In some cases, the management system 102 may communicate with the client devices 104 via a network 106. The network 106 may comprise the Internet, a wireless network, a cellular network, a Wide Area Network (WAN), a local area network (LAN), or any other type of network 106 which allows for exchange of communications.

In example embodiments, the management system 102 establishes and maintains processes, procedures, and other mechanism that allow the runtime environment to easily manage software change processes. Additionally, the management system 102 may manage, create, or host the runtime environment that provides the software change process orchestration during runtime. In example embodiments, this runtime environment uses the processes, procedures, and other mechanisms established by the management system 102 to perform the software change process orchestration (also referred to as "orchestration"). The runtime environment will be discussed in more detail below. The management system 102 will be discussed in more detail in connection with FIG. 2 below.

In one embodiment, the management system 102 may comprise an on-demand system which is hosted by a service provider associated with the management system 102. The on-demand system comprises one or more network applications that provide services and support to the client device 104 (e.g., customer or business) without the client device 104 having to host the system on their premises. That is, the service provider hosts (e.g., offers, provides, implements, executes, or performs one or more operations of) the systems and the client device 104 can access functionalities online through a software-as-a-service (SaaS) model. The on-demand systems may include, for example, services and support for supply chain management, human resource management, customer relationship management (CRM), financial and accounting management, compliance management, supplier relationship management, software management, or any other form of management.

In alternative embodiments, the network applications may be located at the client device 104 (e.g., on-premise model). As such, the client device 104 may implement, execute, or perform one or more operations of the network applications. In these cases, the management system 102 may still provide software change process orchestration to enable software changes to the network applications running on-premise.

The environment 100 of FIG. 1 is merely an example, and alternative embodiments may comprise any number of management systems 102 communicatively coupled to any number of client devices 104. Furthermore, components and functions of the management system 102 and the client devices 104 may be combined, separated, or located elsewhere in the environment 100 (e.g., some components shown as part of the management system 102 may be located at the client device 104, or vice-versa).

Figure 2:
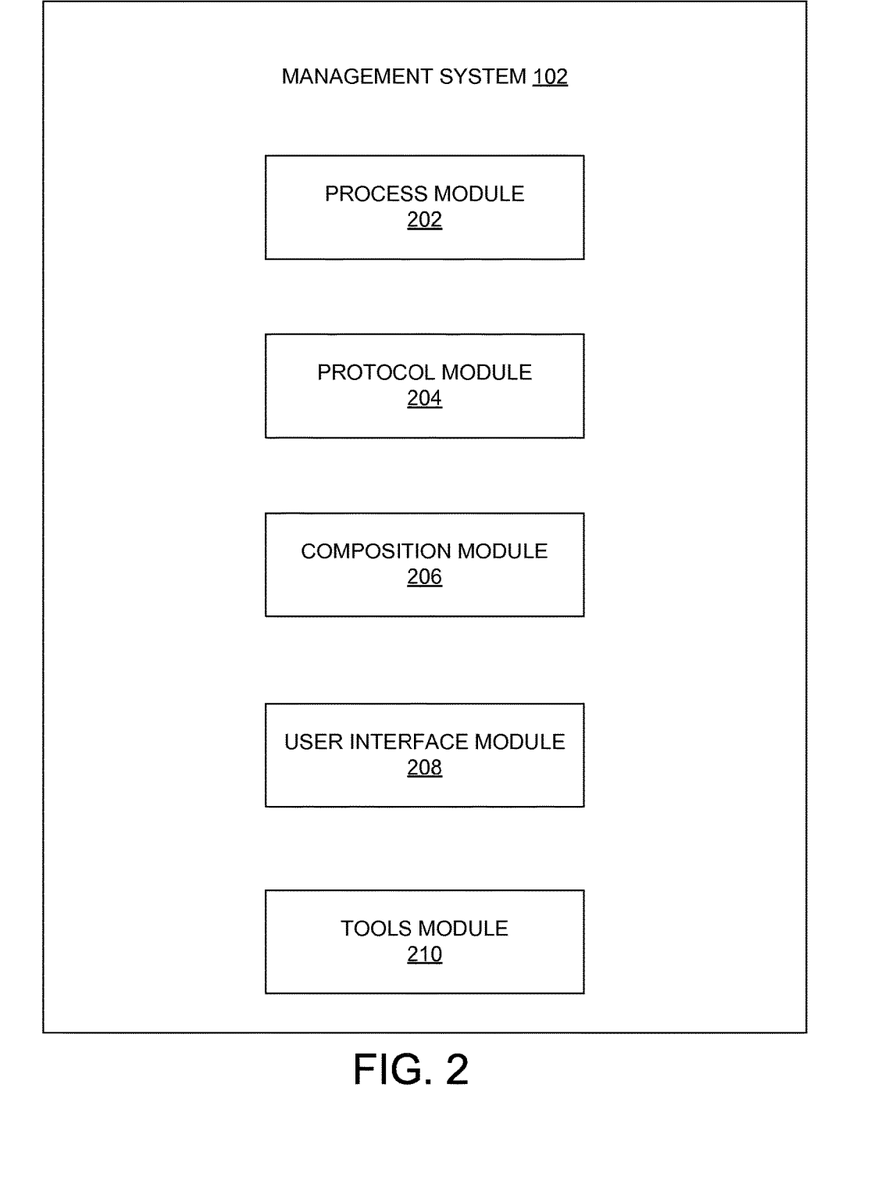
FIG. 2 is a block diagram illustrating components of a management system of the environment of FIG. 1.

FIG. 2 is a block diagram illustrating components of the management system 102. In order to address complexity and consumability (e.g., user experience to execute changes) issues, the management system 102 establishes components that may be used in the software change process orchestration. To enable this, the management system 102 comprises a process module 202, a protocol module 204, a composition module 206, a user interface module 208, and a tools module 210 which may be communicatively coupled together.

The process module 202 manages a set of software change processes for use across the different platforms and environments 100. The process module 202 may define change processes for a product portfolio in a consistent pattern. That is, a software logistic task to be carried out may be defined by steps (identified by patterns) that build up a process. Examples of the change processes include setup of a new product instance, upgrade to a new major version, deployment of a support package to change a minor version, and deployment of a patch.

For these processes, the process module 202 may define process layers. There may be many individuals and components that contribute their part to a process (e.g., the upgrade or installation process). From this perspective, it is crucial that content that is subject to the execution of the process has the right layering such that individual upgrade or installation procedures of the different components can be developed and shipped in an appropriate way.

In some embodiments, there may be one or more layers specific for a user (e.g., company) executing the process. For instance, an upgrade project within a company to implement a new version of an enterprise resource planning (ERP) software may include three layers. Layer 1 may be a complete project in the company, including financial considerations, definition of scope, downtime planning, staffing, and risk assessment. Layer 2 may be an upgrade of the development, test and production system with specific steps in the process (e.g., downtime planning, test scope). Layer 3 may use several tools implementing base procedures.

In other embodiments, the layers may be specific for a runtime environment. For instance, an on-demand deployment requires or allows different process than an on-premise deployment of the same software. In the on-demand deployment, an on-demand provider may run a large set of identical systems or tenants and may want to run a mass deployment operation. In contrast, an on-premise deployment may involve an information technology (IT) department with one highly individual system. The processes of these two layers may consume base change procedures. The base change procedures are implemented by tools which may be specific for the product or platform, and are additionally extensible for product specific tasks, even for products implemented on the same platform. For example, a procedure may require running a certain data migration program specific for the product as it touches product specific data.

The base change procedures may be specific for a certain runtime environment (e.g., a tenant management for a SaaS solution) or are extensible for environment 100 specific tasks. As such, extension points may be defined for the different processes by the process module 202. Because extension points are process specific, an upgrade process may have extension points that are different than an installation process. Therefore, there may be a product independent core of the process and extensions that allows for reacting to specificities of the products and different environments. For example, in a SaaS solution of a product compared to an on-premise solution of a product, the differences can be taken into account through extensibility. Extensibility also calls for having the right technological layering of the extensions to account for the different contributors to such a logistic process. For instance, a database backup may be executed using a filer snapshot when available or may run a database backup depending on the infrastructure an operating organization is using. In this case, the base change procedures may make use of filer tooling or use a different implementation, provided by the operations organization.

The protocol module 204 manages a software logistics protocol (also referred to as "command protocol"). Each tool that implements a software logistics process is equipped with the software logistics protocol. The software logistics protocol comprises a uniform process interface to start a software logistics process, to monitor the software logistics process, to hand over parameters, and to gather values after running a couple of statistics. As such, the software logistics protocol manages calls to the tools. The uniform process interface may not be unique to any particular process. Instead, the processes share, through the software logistics protocol, the same process interface. Thus, the command protocol provides consumption mechanisms for humans (e.g., visualized by the uniform UI) and for machines, which allows the usage of the tools by other tools implementing higher layer processes.

Conventionally, a large set of different tools are used within different "change processes" to run the "base change procedures" for different platforms, products on different platforms, or processes in a specific environment. To simplify orchestration, the protocol module 204 enables the different tools to support one common protocol (i.e., the command protocol or software logistics (SL) protocol) to control the tools. As all tools comply with the same protocol, a consumer only needs to know one common protocol. For example: the commands "start", "getStatus", "getErrorMessage" and the like may be the same for all tools.

Furthermore, the protocol module 204 manages mapping of processes to the tools. In essence, the protocols indicate how to access the tools. In one embodiment, a process map may be maintained where a list of all change processes for products are mapped to the corresponding tool for performing the process. For a request to implement a specific product in a specific environment, the protocol module 204 may act as a "protocol proxy" that maps the request from a "base change procedure" for the specific product to a certain tool. As such, the consumer does not need to identify which tool or tools are used for the different types of components being deployed to different runtime environments that the product uses. For example, for the tools used to install HANA (hdbinst), BW (sapinst), and SEM-BW Add-On on top of BW (saint), the protocol proxy maps the "install" for tree components (HANA, BW, SEM-BW) to a respective tool "hdbinst, sapinst, saint."

Different processes share the same meta-structure. For example, the meta-structure may include a preparation phrase where prerequisites are checked, a parameter entry phase where a user may specify a password, an execution phase, and a post-preparation or post check phase where results of the execution are checked. In some cases, there may also be a presentation of a summary of the results. In example embodiments, the execution step and the nature of the parameters that are input may be different for each process. As such, the protocol module 204 may define a least common denominator between the different processes, and encode these least common denominator into the protocol.

In some embodiments, a composition module 206 may comprise orchestration tools that put the different processes and tools together to create composed processes. For example, for an up-to-date install, a composed process for installing the latest available software version is created by taking a latest version of an installer and applying support packages and patches which have been released since the last installer version. Other examples where composed processes may be created include a one-shot install for installing a complete stack, a cross runtime product installer for taking the different components and deploying them in different runtimes, and a mass install for installing a large number of the same product to enable use by a large number of different consumers. There may also be combinations of these processes such as, for example, a mass install of a cross runtime product including the runtime below (e.g., one-shot install), and all of these with the latest version (e.g., up-to-date install).

The user interface module 208 manages uniform interfaces for the orchestration process. In example embodiments, the user interface module 208 may define a standard (uniform) UI which can display dialogs, monitoring controls, and error messages of the tools that is process independent. Accordingly, the user interface module 208 may identify change process patterns (e.g., to monitor a process, to enter parameters for the process, to use statistics, how logs are shown, how errors are handled). The user interface module 208 attempts to achieve a certain uniformity throughout the different software logistic processes using reusable change process patterns to generate a uniform UI (e.g., without requiring the user to create the UI) regardless of the process (e.g., handling errors, providing statistics, parameter entry, monitor execution). Furthermore, in order to appropriately render specificities of different processes during runtime, the user interface module 208 may receive some metadata with the software logistics protocol (e.g., UI metadata that controls how the UI behaves if there are specificities to be taken care of). The patterns may define, for example, how a frame for a process is going to look, how different steps in a wizard are going to be displayed, what is mandatory information on the wizard button in order to continue or abort, what the monitoring of the process is going to look like, how progress of an execution is described, how to log the information, and how to present an error in a common way.

In some embodiments, the UI patterns may be implemented in one application: UI5, which is a JavaScript UI that renders HTML5 to a user. In these embodiments, it may be the same JavaScript that is used for the different processes. As such, a single generic application is able, based on the protocol, to retrieve or to render data being conveyed by the protocol. The rendering is performed in the same way according to the patterns that are identified.

The tools module 210 manages the tools that implement one or more software logistic processes. As such, these tools implement the commands defined in the command protocol to enable orchestration. The tools used to execute the processes can be consumed through a standard protocol mapping the change activities to tool commands. These tools may be capable of performing an upgrade, an installation, a configuration, or a correction. In order to actually do something with a product under consideration (e.g., an object to be upgraded or installed), the tool needs to have its own set of commands, APIs to be called, or some operating system command to be executed.

In example embodiments, a standard protocol is used for all the different tools, and all the tools have the same uniform interface where the resources are being exposed. There are differences/specificities between the different processes but the protocol is designed such that the differences can be handled in an automated machine controlled way. An interface takes care of these differences. So all the tools expose the same API to the interface, to a programmatic consumer, for example. That same API is part of the same protocol mapping.

Figure 3:
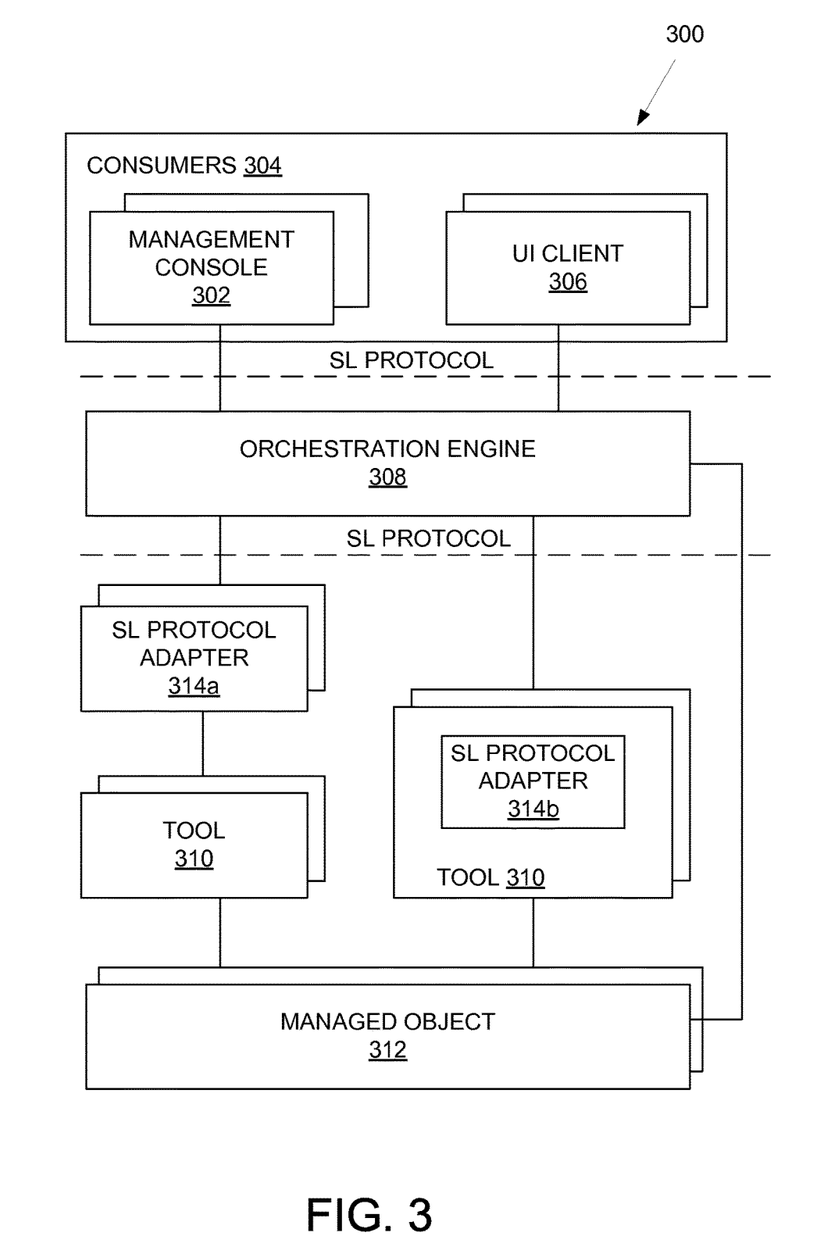
FIG. 3 is a block diagram illustrating components of an example runtime environment

FIG. 3 is a block diagram illustrating components of an example runtime environment 300. In the example, runtime environment 300 comprises three process layers (e.g., separated by dashed lines). Process layer 1 comprises management consoles 302 that are a part of consumers 304 in the runtime environment 300. The management consoles 302 may be programmatic consumers of tools and may include, for example, a service provider cockpit (SPC), a solution manager, or a landscape visualization manager (LVM). The SPC is a management tool or orchestration tool that manages SaaS offerings. The solution manager is a counterpart of the SPC for managing on-premise solutions, while the LVM is a management console 302 for certain aspects of the on-premise landscape. However, not all activities may be driven by the management consoles 302. In some cases, the customer may manually define (e.g., using Excel sheets) lifecycle management processes where various tools may be implemented in a few of the steps of the overall process.

In some embodiments, a UI client 306 implements an HTML5 technology UI (referred to as "UI5") running on a browser. It is also contemplated that mobile UIs may be used. While embodiments use UI5, it is noted that other forms of UI may be utilized in alternative embodiments.

Process layer 2 comprises an orchestration engine 308. The orchestration engine 308 provides orchestration between the different software logistics processes. For example, an installation and an update may be combined by taking an initial version that is installed and adding an update to the initial version to obtain a final software version. As such, the orchestration engine 308 may start with a lower release of a software version and combine updates to obtain the latest software version. In some embodiments, the orchestration engine may be located at the management system 102 and/or comprise some of the components of the management system 102.

Process layer 3 (and possibly layer 4) comprises tools 310 that embody lifecycle management processes, and may be addressed via a software logistic (SL) protocol. In example embodiments, the management consoles 302 or UI client 306 consume software logistics processes implemented by these tools 310. These tools 310 may access a managed object 312, which is the system to which the software change is to be applied (e.g., installed, updated, or corrected). The SL protocol is an abstraction of how to gain uniform access to the different tools 310. As such, the consumers 304 may use the same SL protocol to gain access to functionalities of the tools 310 which provides access to the process.

The SL protocol may be implemented by an internal SL protocol adapter (not shown) of the orchestration engine 308 or an external SL protocol adapter 314. The SL protocol adapters 314a expose existing legacy tools 310 that may have their own proprietary interface. By positioning the SL protocol adapter 314a in front of the existing legacy tool 310, the proprietary interface may be shielded. Alternatively, the tool 310 may comprise the SL protocol adapter 314b within itself. In yet further embodiments, the managed objects 312 may expose their functionality (e.g., as coarse-grained as possible) directly via the SL protocol, thus enabling the managed object 312 itself to implement the SL protocol such that the orchestration engine 308 may have direct access to the managed object 312. In these cases, the tools 310 may not be needed.

Figure 4:
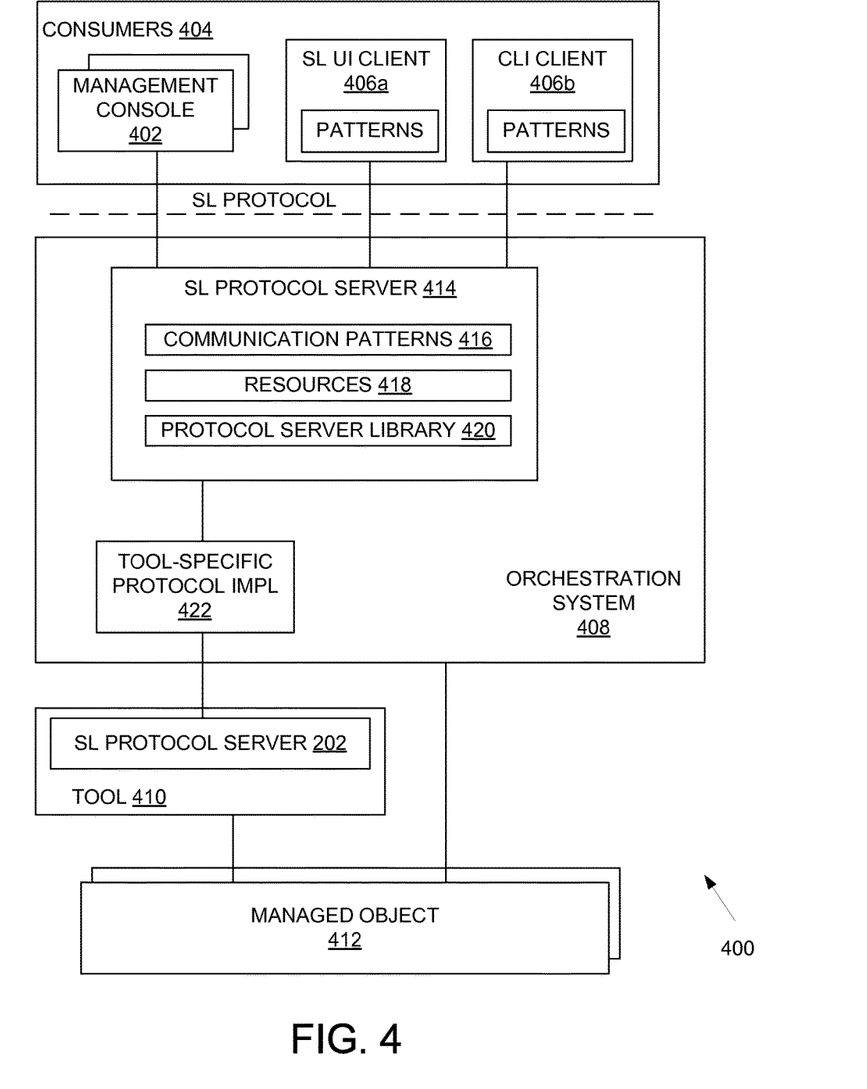
FIG. 4 is a block diagram illustrating a more detailed example of an alternative runtime environment.

Referring now to FIG. 4, a block diagram illustrating an alternative example of a runtime environment 400 is shown. The runtime environment 400 may be an expansion of the runtime environment 300 of FIG. 3. In this example environment 400, consumers 404 have been expanded to include different types of UI clients. For instance, the consumers 404 include a software logistic UI client 406a similar to the UI client 306 of FIG. 3. However, a command line interface (CLI) client 406b may also be utilized. The CLI client 406b allows a tool to be invoked or controlled through the CLI client 406b directly (e.g., from a CLI or a scripted environment) without using the SL UI client 406a or programmatic access of a management console 402 (e.g., layer 1 tool such as SPC, solution manager, or LVM). Additionally, patterns are shown in the SL UI client 406a and CLI client 406b to illustrate that there is some uniformity in the clients 406—that is the clients 406 may all make use of the same interaction patterns.

An orchestration system 408 (may also be referred to as an orchestration engine) provides a SL protocol server 414. The SL protocol server 414 defines communication patterns 416 in order to capture behavior of the protocol over time. For example, a process cannot be started without having defined, for instance, a parameter. In another example, a behavior may define how to react when an error occurs—such as which resource should be queried and how to define further actions based on the error (e.g., aborting the process or performing a retry). As such, these behaviors are part of the communication patterns 416.

Resources 418 are exposed through a representational state transfer (REST) API of statistical data of a process run. Logs, errors, or statuses of different steps that have been carried out, for example, may be part of the resources 418. As such, in one embodiment, the protocol may be a REST space protocol. HTTP words, such as, "put" and "post" and "get" may be used in order to manipulate the different tools that implement SL processes. A few resources 418 may be defined (e.g., process instances and process definitions). For example, there may be a resource 418 to monitor or get status which is using a monitoring pattern to provide a status of the execution of the process. Other resources 418 may allow defining of parameters that need to be entered by the user or the consumer 404 of the protocol to start a process, to choose options of the process, or to give a list of phases or steps of the process such that they can be depicted in a user interface accordingly or accessed programmatically. There may also be error resources, login resources, and so on in order to obtain more details.

A protocol server library 420 manages messages associated with the protocol. In example embodiments, the entire protocol may comprise XML messages being exchanged between the client 406 and the SL protocol server 414. As such, the protocol server library 420 parses these messages and understands HTTP words (e.g., whether something should be written as a post command, should be read only, or composes correct messages based on the resources 418 that are requested through the different messages).

The SL protocol server 414 may be linked to a tool-specific protocol implementation that is managed object-specific. Thus, the tool-specific protocol implementation 422 allows the orchestration system 408 to carry out an installation, an update, and so on by providing tool specificities. In some embodiments, the tool-specific protocol implementation 422 may comprise a SL process runtime executor. When a tool implements more than one process, the tool implementation may be split up in the SL process runtime executor. That is, the different process implementations may be managed by the SL process runtime executor. In some embodiments, the orchestration system 408 may be located at the management system 102 and/or comprise some of the components of the management system 102.

For on-premise and SaaS embodiments, the runtime environment 400 may comprise the same architecture. However, the components may be located in different places (e.g., at the user's site or at the managed system 102). The only difference may be that the management console 402 (e.g., layer 1 tools) that consumes the tools 410 is different. For example, the SPC may be used for the SaaS environment whereas the solution manager may be used for the on-premise environment. As such, there are different management consoles 402 that consume the same tools 410 allowing for uniform orchestration of software change processes regardless of platform or runtime environment 400 (also referred to as being "platform agnostic"), as well as product or managed object 412.

Figure 5A:
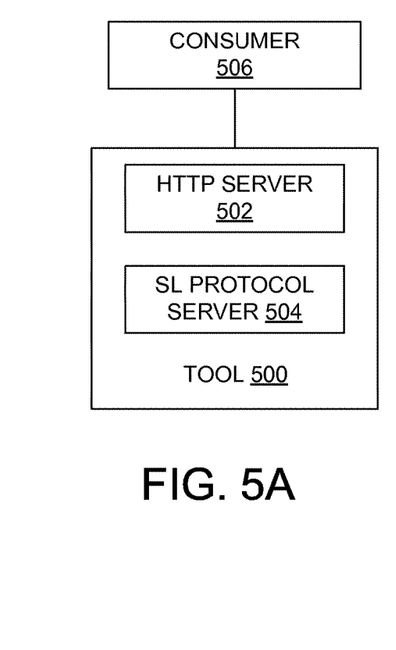
FIG. 5A is a block diagram illustrating a technical solution architecture using an on-premise device.

FIG. 5A is a block diagram illustrating a technical solution architecture using an on-premise device. In example embodiments, the SL protocol, from a technical perspective, is a REST call over HTTP from a consumer 506. As such, a tool 500 may comprise a HTTP server 502. Behind the HTTP server 502 is a SL protocol server 504. The embodiment of FIG. 4 does not illustrate the HTTP server 502 because the embodiment of FIG. 4 is on a different level of abstraction (e.g., communication layers). From a technical perspective, the embodiment of FIG. 5a provides that the consumer 506 may issue a REST call over HTTP and that REST call reaches the internal HTTP server 502. Then, the SL protocol server 504 handles SL protocol semantics once a post or call is received by the HTTP server 502.

Figure 5B:
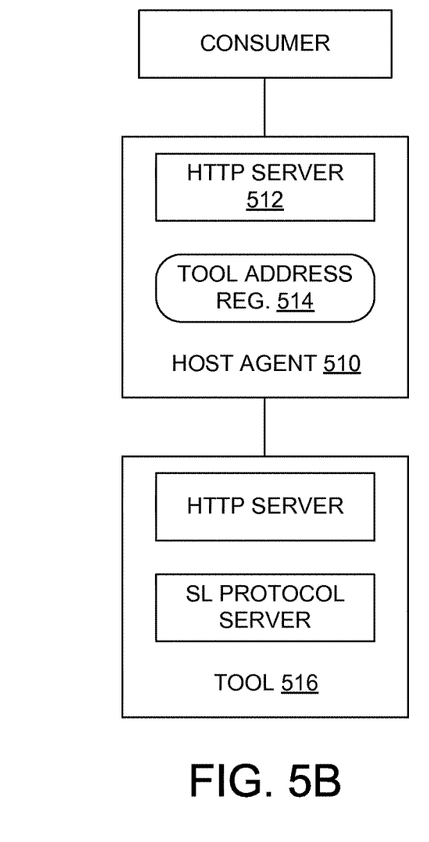
FIG. 5B is a block diagram illustrating a technical solution architecture using a software as a service device.

FIG. 5B is a block diagram illustrating a technical solution architecture using a software as a service device. In the embodiment of FIG. 5B, a host agent 510 is provided prior to the tool 516. The tool 516 may be embedded in products themselves that should be handled through software logistic procedures/processes (e.g., Java application server, advanced business application programming (ABAP) application server). In some embodiments, the software comprises a database plus a couple of application servers in which the business applications are executed. Business programs are stored in the database and a few software logistic tools are located inside the application servers providing built-in technology where the business programs are built. The other set of logistic tools are the ones that reside in the operating system. Some of these logistic tools are built natively or are a compiled C program or a standard Java program.

For the Java embodiment, the host agent 510 is provided, which is an executable running as a service in an operating system present at each host/operating system on which the software is operating. Accordingly, the REST calls may be tunneled with the SL protocol through the host agent 510. As such, a HTTP server 512 is embedded in the host agent 510 along with some address knowledge about where to find the individual tools that reside in the operation system (e.g., tool address registry 514). As such, the tool address registry 514 allows use of more efficient communication mechanisms between the host agent 510 and different tools 516.

Figure 6:
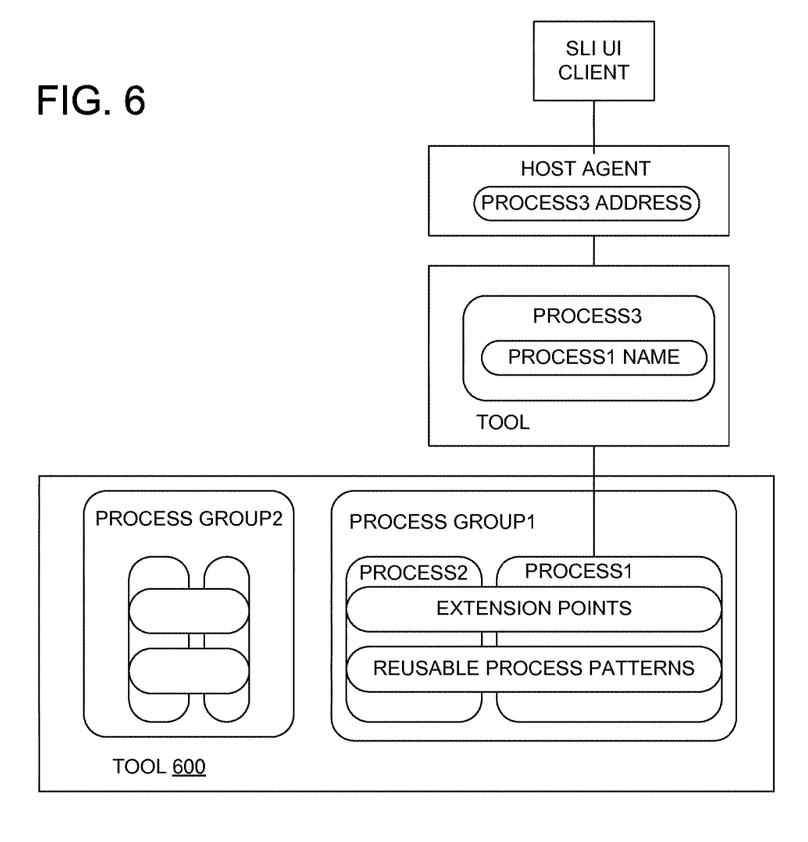
FIG. 6 is a block diagram illustrating a runtime architecture showing processes.

FIG. 6 is a block diagram illustrating a runtime architecture showing the use of processes and process groups. Referring to a lower portion of FIG. 6, a tool 600 implementing SL processes can define groups of these processes. For example, a configuration process may include a configuration used to copy systems (e.g., take a system and create a copy of that). There may be certain configuration steps to be carried out through that configuration process. Additionally, there may be different types of copies that can be carried out. Therefore, these system copies may be grouped into one process group (e.g., process group 1). The process group may comprise different processes or different ways of performing the system copies. These different processes may share a set of extension points. Thus, usable steps or combinations of steps reused through process 1 and process 2 are grouped into process group 1. In the system copy example, an import step of some data may be needed. This import step reuses components since it appears in both types of system copy processes (as defined by the reusable process patterns).

The host agent is a proxy similar to that shown in FIG. 5B. In example embodiments, the orchestrating tool is able to route a request through or act as a process manager. The host agent knows it has implemented processes on its own (e.g., process 3), but may also invoke process 1 underneath. Because the system copy is embedded in some other process, the system copy (process 1) is part of a more complex process procedure (process 3).

Figure 7:
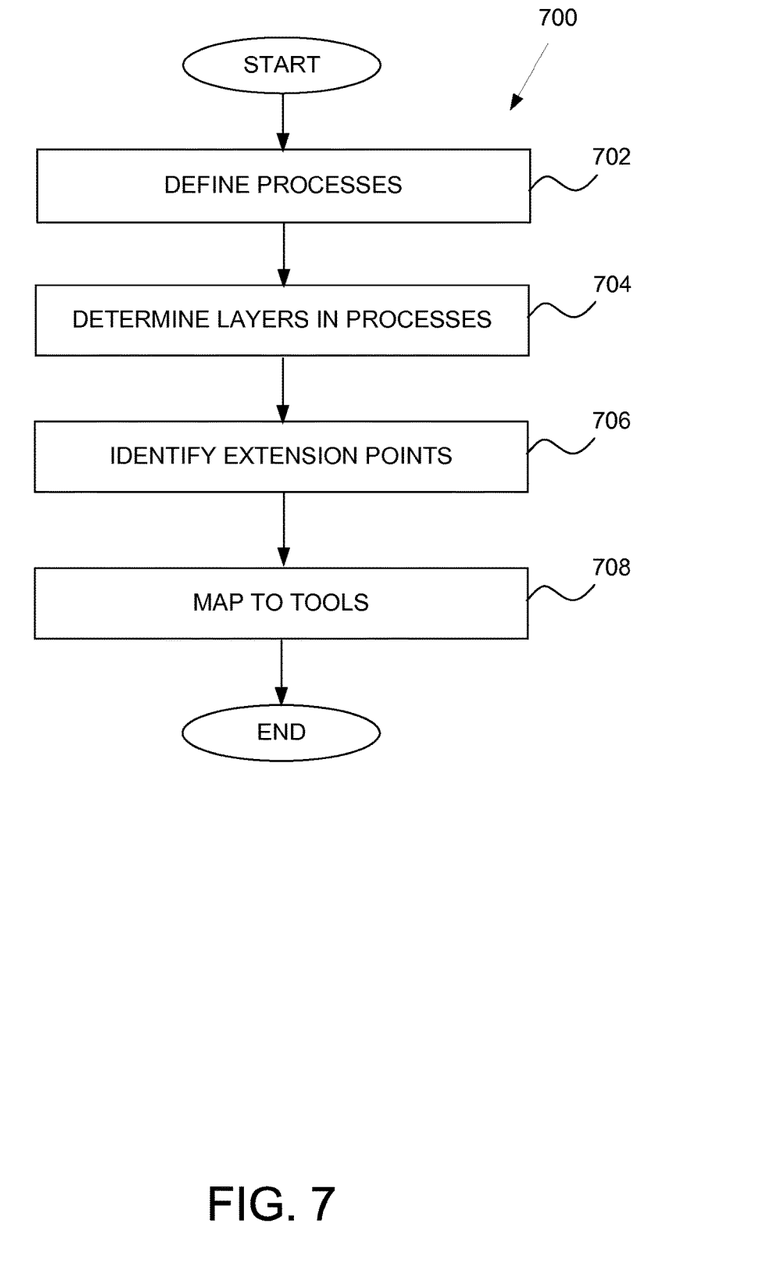
FIG. 7 is a flowchart of an example method for establishing processes for use in software change process orchestration.

FIG. 7 is a flowchart of an example method 700 for establishing processes for use in software change process orchestration. In example embodiments, the method 700 is performed by the management system 102. In operation 702, a consistent set of processes for software changes across different platforms and environments is defined. These processes may be based on consistent patterns that are identified. Examples of change processes may include, for example, setup of a new product instance, upgrade to a new major version, deployment of a support package to change a minor version, and deployment of a patch.

In operation 704, process layers are determined for the processes. There may be one or more layers that are specific for a company/customer executing one of the processes. For example, an upgrade project within a company to implement a new version of an ERP may comprise three layers. Layer 1 may include a complete project in the company including financial considerations, definition of scope, downtime planning, staffing, and risk assessment. Layer 2 may include an upgrade of the development, test and production system with its own specific steps in the process (e.g., downtime planning, test scope). Layer 3 may use several tools implementing the base procedures.

In operation 706, extension points may be identified. These extension points allow a company to customize the process to their particular requirements. For example, a customized tool may be plugged into the extension point to customize the process.

In operation 708, tools may be mapped to the processes. In example embodiments, the protocol module 204 manages mapping of processes to the tools. In essence, the protocols indicate how to access the tools. As such, the consumer does not need to identify which tool or tools are used for the different types of components being deployed to different runtime environments that the product uses.

Figure 8:
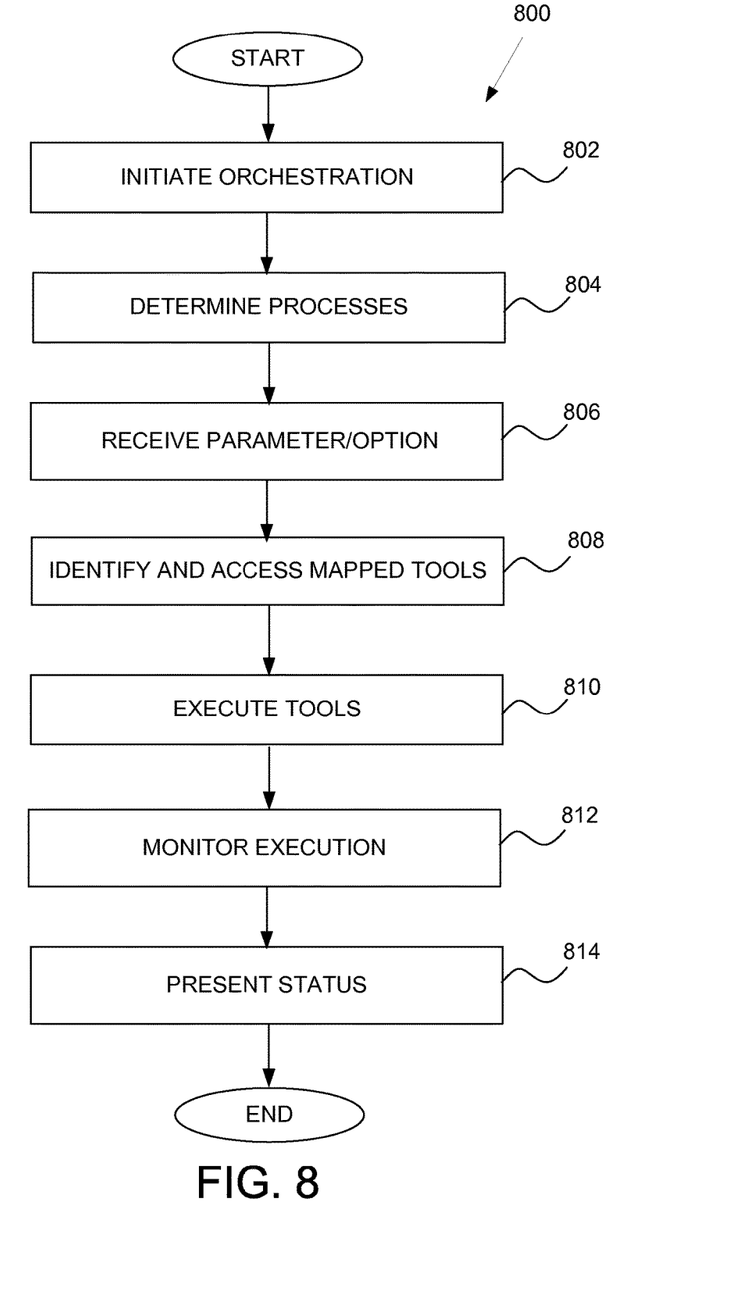
FIG. 8 is a flowchart of an example method for performing software change process orchestration.

FIG. 8 is a flowchart of an example method 800 for performing software change process orchestration in a runtime environment. In operation 802, software change process orchestration is initiated. For example, an installation or an upgrade to a product may be initiated.

Once the orchestration is initiated, the specific processes involved with orchestration are determined in operation 804. As such, one or more processes that correspond to the type of software change process that is desired are determined.

In operation 806, parameters or options that may be required by the tools are received. In example embodiments, a uniform UI may be presented to the user to allow the user to enter one or more parameters.

In operation 808, the tools that are mapped to the determined processes are identified and accessed. According to example embodiments, the tools may be identified and accessed using a uniform SL protocol. The tools are then executed in operation 810.

The execution may be monitored in operation 812 and the status presented to the user in operation 814. The presentation of the status may be implemented using the uniform UI.

Figure 9:
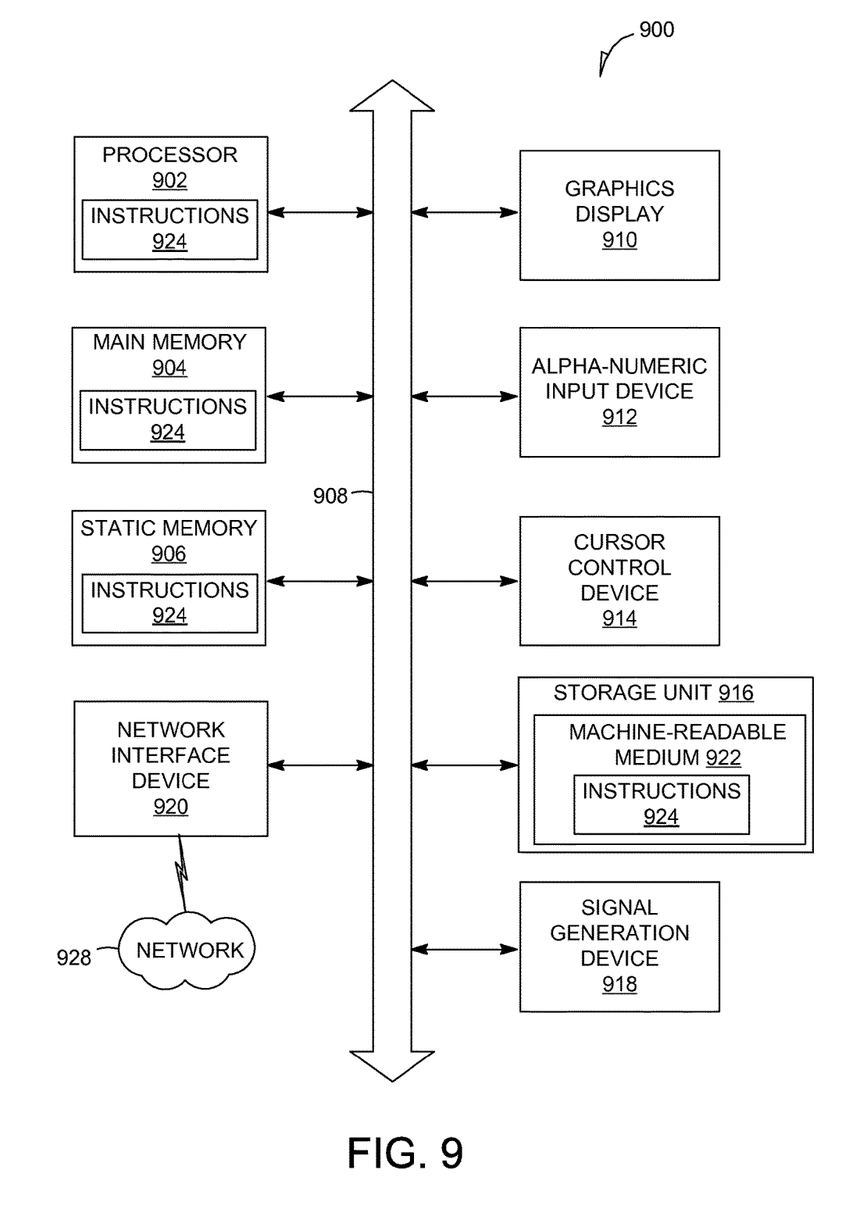
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alpha-numeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the static memory 906, within the processor 902 (e.g., within the processor's cache memory), or both, during execution thereof by the machine 900. Accordingly, the main memory 904, static memory 906, and the processor 902 may be considered as machine-readable media 922. The instructions 924 may be transmitted or received over a network 926 via the network interface device 920.

As used herein, the term "memory" refers to a machine-readable medium 922 able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions 924. The term "machine-readable medium" shall also be taken to include any medium, or combination of multiple media, that is capable of storing instructions 924 for execution by a machine (e.g., machine 900), such that the instructions 924, when executed by one or more processors of the machine 900 (e.g., processor 902), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 924 may further be transmitted or received over a communications network 928 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 922 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 902 or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor 902, such as a field programmable gate array (FPGA) or an ASIC. A hardware module may also include programmable logic or circuitry that is temporarily configured by software to perform certain operations. For example, a hardware module may include software encompassed within a general-purpose processor 902 or other programmable processor 902. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 902 configured by software to become a special-purpose processor 902, the general-purpose processor 902 may be configured as respectively different special-purpose processors 902 (e.g., comprising different hardware modules) at different times. Software may accordingly configure a processor 902, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module implemented using one or more processors 902.

Similarly, the methods described herein may be at least partially processor-implemented, a processor 902 being an example of hardware. For example, at least some of the operations of a method may be performed by one or more processors 902 or processor-implemented modules. Moreover, the one or more processors 902 may also operate to support performance of the relevant operations in a "cloud computing" environment or as a "software as a service" (SaaS). For example, at least some of the operations may be performed by a group of computers (as examples of machines 900 including processors 902), with these operations being accessible via a network (e.g., the Internet) and via one or more appropriate interfaces (e.g., an application program interface (API)).

The performance of certain of the operations may be distributed among the one or more processors 902, not only residing within a single machine, but deployed across a number of machines. In some example embodiments, the one or more processors 902 or processor-implemented modules may be located in a single geographic location (e.g., within a home environment, an office environment, or a server farm). In other example embodiments, the one or more processors 902 or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
 defining, by a computer system, a set of software change processes across different platforms and environments;
 mapping, by the computer system, each software change process to at least one tool for performing each software change process to generate a software change process map comprising a list of software change processes and at least one corresponding tool for performing each software change process;

receiving, at the computer system, an indication to initiate a software change process orchestration;

identifying, by the computer system, a first software change process and a second software change process to be performed for the software change process orchestration in response to receiving the indication;

accessing, by the computer system, the software change process map comprising the list of change processes mapped to at least one corresponding tool for performing each change process to identify at least one first corresponding tool for the first software change process and at least one second corresponding tool for the second software change process;

creating, by the computer system, a composed process by combining the first software change process to be performed for the software change process orchestration and the at least one first corresponding tool for performing the first software change process, and the second software change process and the at least one second corresponding tool for performing the second software change process;

triggering, by the computer system, execution of the at least one first corresponding tool for performing the first software change process and the at least one second corresponding tool performing the second software change process of the composed process, using a uniform software logistic protocol that manages calls to tools across different platforms and environments, the software logistic protocol comprising a uniform process interface that starts and monitors a software change process;

monitoring, by the computer system, status of an execution of the at least one first corresponding tool and the at least one second corresponding tool during the first software change process and the second software change process of the composed process; and presenting, by the computer system, the status of the execution of the at least one first corresponding tool and the at least one second corresponding tool during the software first change process and the second software change process of the composed process on a uniform user interface that is process independent.

2. The method of claim 1, wherein monitoring the status comprises using a monitoring pattern to provide the status of the execution.

3. The method of claim 1, wherein the status comprises statuses of different steps that have been carried out in the execution of the at least one first corresponding tool and the at least one second corresponding tool during the first software change process and the second software change process of the composed process.

4. The method of claim 1, wherein the uniform interface defines one or more of how a frame for the software change process looks, how different steps in a wizard are displayed, what is mandatory information on a wizard button in order to continue or abort, what the monitoring of the process looks like, how progress of an execution is described, how to log information, or how to present an error in a common way.

5. The method of claim 1, further comprising providing an extension point to receive a customized tool to configure the first software change process into a customized process specific for a particular environment.

6. The method of claim 1, wherein defining the set of software change processes across different platforms and environments comprises determining a consistent set of processes for software changes across the different platforms and environments based on patterns.

7. The method of claim 6, further comprising defining layers for each process of the consistent set of processes.

8. The method of claim 1, wherein the first process to be performed for the software change process orchestration is a composed process that is a grouping of a plurality of processes.

9. The method of claim 1, further comprising providing an agent to implement an adapter for the tool.

10. The method of claim 1, further comprising providing a protocol adapter to include execution of an existing legacy tool in the process.

11. The method of claim 1, wherein the first software change process and the second software change process share the same meta-structure.

12. The method of claim 11, wherein the meta-structure comprises at least one of a group comprising a preparation phase, a parameter entry phase, and execution phase, a post-preparation, and post-check phase.

13. The method of claim 1, further comprising:
providing, by the computer system, the uniform user interface that is process independent and uniform across a plurality of different processes, the uniform user interface displaying information related to the software change process and generated based on change process patterns of the plurality of different processes;
receiving, at the computer system, user interface metadata with the uniform software logistic protocol, the user interface metadata causing rendering and display of specificities of the software change process on the uniform user interface during runtime; and
receiving a parameter or an option using the uniform user interface that is process independent.

14. The method of claim 1, wherein the at least one first corresponding tool for performing the first software change process and the at least one second corresponding tool for performing the second software change process each comprise the uniform software logistic protocol comprising the uniform process interface.

15. A tangible machine-readable storage medium having no transitory signals and storing instructions which, when executed by the at least one processor of a machine, cause the machine to perform operations comprising:
defining a set of software change processes across different platforms and environments;
mapping each software change process to at least one tool for performing each software change process to generate a software change process map comprising a list of software change processes and at least one corresponding tool for performing each software change process;
receiving an indication to initiate a software change process orchestration;
identifying a first software change process and a second software change process to be performed for the software change process orchestration in response to receiving the indication;
accessing the software change process map comprising the list of change processes mapped to at least one corresponding tool for performing each change process to identify at least one first corresponding tool for the first software change process and at least one second corresponding tool for the second software change process;

creating a composed process by combining the first software change process to be performed for the software change process orchestration and the at least one first corresponding tool for performing the first software change process, and the second software change process and the at least one second corresponding tool for performing the second software change process;

triggering execution of the at least one first corresponding tool for performing the first software change process and the at least one second corresponding tool performing the second software change process of the composed process, using a uniform software logistic protocol that manages calls to tools across different platforms and environments, the software logistic protocol comprising a uniform process interface that starts and monitors a software change process;

monitoring status of an execution of the at least one first corresponding tool and the at least one second corresponding tool during the first software change process and the second software change process of the composed process; and presenting the status of the execution of the at least one first corresponding tool and the at least one second corresponding tool during the software first change process and the second software change process of the composed process on a uniform user interface that is process independent.

16. The tangible machine-readable storage medium of claim 15, wherein monitoring the status comprises using a monitoring pattern to provide the status of the execution.

17. The tangible machine-readable storage medium of claim 15, wherein the operations further comprise:
providing an extension point to receive a customized tool to configure the first software change process into a customized process specific for a particular environment.

18. The tangible machine-readable storage medium of claim 15, wherein defining a set of software change processes across different platforms and environment further comprises
determining a consistent set of processes for software changes across the different platforms and environments based on patterns; and
defining layers for each process of the consistent set of processes.

19. A system comprising:
one or more processors of a machine; and
a hardware storage device storing instructions that, when executed by the one or more processors, causes the one or more processors to perform operations comprising:

defining a set of software change processes across different platforms and environments;

mapping each software change process to at least one tool for performing each software change process to generate a software change process map comprising a list of software change processes and at least one corresponding tool for performing each software change process;

receiving an indication to initiate a software change process orchestration;

identifying a first software change process and a second software change process to be performed for the software change process orchestration in response to receiving the indication;

accessing the software change process map comprising the list of change processes mapped to at least one corresponding tool for performing each change process to identify at least one first corresponding tool for the first software change process and at least one second corresponding tool for the second software change process;

creating a composed process by combining the first software change process to be performed for the software change process orchestration and the at least one first corresponding tool for performing the first software change process, and the second software change process and the at least one second corresponding tool for performing the second software change process;

triggering execution of the at least one first corresponding tool for performing the first software change process and the at least one second corresponding tool performing the second software change process of the composed process, using a uniform software logistic protocol that manages calls to tools across different platforms and environments, the software logistic protocol comprising a uniform process interface that starts and monitors a software change process;

monitoring status of an execution of the at least one first corresponding tool and the at least one second corresponding tool during the first software change process and the second software change process of the composed process; and presenting the status of the execution of the at least one first corresponding tool and the at least one second corresponding tool during the software first change process and the second software change process of the composed process on a uniform user interface that is process independent.

20. The system of claim 19, wherein the status comprises statuses of different steps that have been carried out.

* * * * *